F. P. FENTRESS.
FOLDING STEP FOR BICYCLES.
APPLICATION FILED JUNE 6, 1914.

1,125,281.

Patented Jan. 19, 1915.

WITNESSES:
H. D. Macdonald
H. McMillan

INVENTOR
F. P. Fentress
Frank P. Fentress

UNITED STATES PATENT OFFICE.

FRANK P. FENTRESS, OF DETROIT, MICHIGAN.

FOLDING STEP FOR BICYCLES.

1,125,281.  Specification of Letters Patent.  Patented Jan. 19, 1915.

Application filed June 6, 1914. Serial No. 843,338.

*To all whom it may concern:*

Be it known that I, FRANK P. FENTRESS, a citizen of the United States, residing at Detroit, in the county of Wayne and State of Michigan, have invented certain new and useful Improvements in Folding Steps for Bicycles, of which the following is a specification.

This invention relates to steps for bicycles, motorcycles, or the like, and it has for one of its objects the provision of a step which may be folded or turned upward against the frame of the bicycle, when not in use, means being provided for holding said step in folded-in condition and at the same time preventing rattling of the loose parts.

The invention has, furthermore, for its object the improved means of arranging the pivot or hinge pintle of the step so that the latter may fold itself against the frame automatically whenever it strikes an obstruction on the front or on the under side thereof, thus obviating damage of either the step or the obstruction.

Further objects of the invention will hereinafter appear and be particularly defined in the claims.

The invention has been clearly illustrated in the accompanying drawings in which similar characters denote similar parts and in which:—

Figure 1:
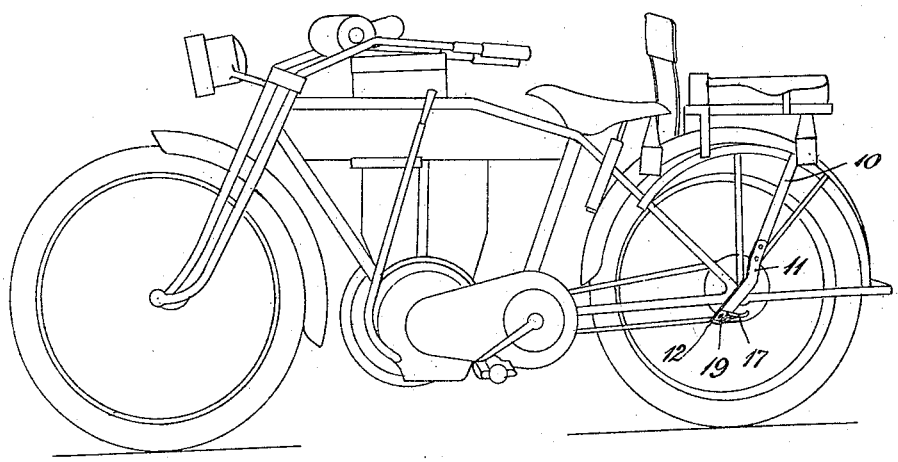
Figure 2:
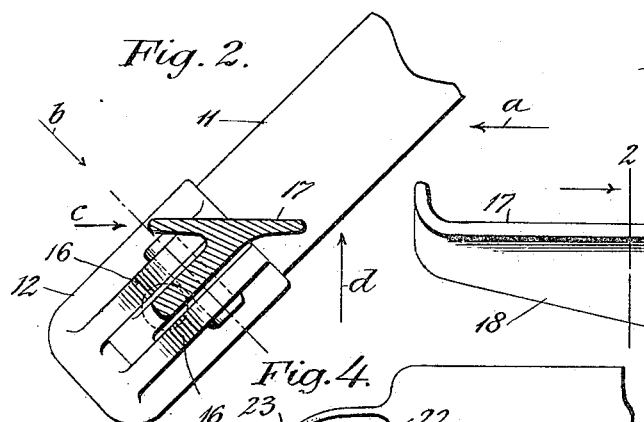
Figure 3:
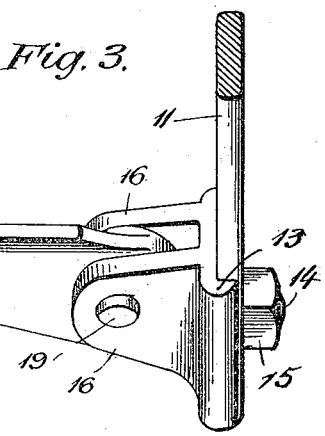
Figure 4:
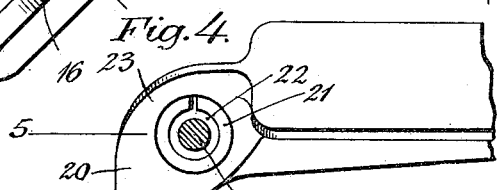
Figure 5:
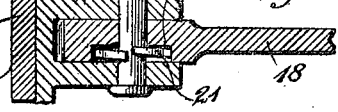

Figure 1 illustrates a side view of a motorcycle equipped with a step embodying my invention. Fig. 2 is a side view, on an enlarged scale, of the step and its supporting bracket, the step itself being shown in section. Fig. 3 is a rear side view of the step and its support, looking in the direction of the arrow *a* of Fig. 2. Fig. 4 is a face view of the step without the bracket, looking in the direction of arrow *b* of Fig. 2. Fig. 5 is a horizontal section on line 5 of Fig. 4.

My improved step may be applied to the frame of a bicycle at any convenient point, and I have shown the same attached to the rear brace 10 of an auxiliary frame which may be employed to support an auxiliary seat or luggage carrier. In the present instance the rear brace 10 has a special side arm 11 rigidly secured thereto, this arm being angularly inclined as shown in Fig. 2 and having at its lower end a bracket 12 provided with side flanges 13 straddling the marginal edges of the member 11. Secured to or formed integral with the bracket, and more particularly with the base plate thereof, is a bolt 14 passing through a suitable aperture in the member 11 and engaged by a nut 15 whereby the bracket in its entirety may be firmly held in contact therewith. Projecting from the side of the base plate of the bracket 12 are a pair of ears 16 between which is pivoted a step which forms the subject matter of the present invention and which comprises a substantially horizontal foot plate 17 the supporting rib 18 of which is fitted between the ears 16, above mentioned. The pivot pin or hinge pintle 19 serves for pivotally connecting the step and bracket, and the step has a projection 20 which engages the base plate of the bracket when the step is in its swung-out or horizontal position and thus limits the downward movement of the same.

One of the principal features of the present invention resides in the fact that the pivot pin 19 is axially disposed at an inclined angle relatively to both the vertical and horizontal line, the inclination illustrated being approximately 45 degrees, this feature causing the step 18 to fold itself upwardly against the frame member 11 whenever an obstruction should strike the front edge of the step in the direction of arrow *c*, or when the force of impact should be in the direction of arrow *d* of Fig. 2, as for instance when the bicycle is laid upon its side. It will be understood from the above that the capability of the step of yielding to the impacts of either or both of the directions *c* and *d*, or in fact of any direction between those mentioned will prevent damage not only to the step itself, but also prevent damage of the obstruction encountered, and, furthermore, the step itself may be made of very light weight, consistent with the function it is intended to perform.

Means are provided whereby the step will not only be held frictionally in position in its bracket, but whereby all rattling between these two members will be obviated, these means consisting preferably of a resilient or spring washer 21 seated within a recess 22 provided in one face of the web 23 of the step, as clearly shown in Fig. 5 in which said washer is illustrated surrounding the pivot pin 19 which may be either a bolt, or a rivet as shown.

I am aware that folding steps have been employed in connection with bicycles and the like, and I therefore do not claim such folding step broadly, but particular emphasis in connection with the present invention is laid upon the fact that the pivotal pin whereby the step is foldably supported on its bracket, is disposed at an angle approximately half way between the vertical and the horizontal line, thus considered when the step is in its normal position on the wheel standing upon the ground.

Changes may be made in the particular construction of the component elements, as for instance in the step and its supporting bracket, as well as in the particular means whereby the step may be maintained in its folded-in condition, without departing from the spirit of the invention.

I claim:—

1. The combination with the frame of a bicycle or the like, of a folding step therefor comprising a foot rest portion pivoted on said frame, the pivot axis being disposed at an angle substantially mid-way between the horizontal and vertical line relative to the line of travel of the bicycle.

2. The combination with the frame of a bicycle or the like, of a bracket secured to said frame and comprising a pair of obliquely disposed ears, a folding step pivoted between the ears of said bracket, the axis of the pivot member being disposed at an angle substantially mid-way between the vertical and horizontal line relative to the line of travel of said bicycle.

3. The combination with the frame of a bicycle, of a folding step therefor comprising a foot rest portion pivoted on said frame, and having its pivot disposed at an angle substantially midway between the horizontal and vertical line relative to the line of travel of the bicycle, and means for frictionally holding said foot rest portion in its folded-in condition.

4. The combination with a frame of a bicycle of a folding step therefor comprising a bracket secured to said frame, a foot rest portion pivoted thereon, and having its pivot disposed at an angle substantially midway between the horizontal and vertical line relative to the line of travel of the bicycle, and a resilient washer interposed between said foot rest portion and said bracket for frictionally holding said step in its folded-in condition.

In testimony whereof I affix my signature in presence of two witnesses.

FRANK P. FENTRESS.

Witnesses:
CHAS. F. SCHMELZ,
H. D. MACDONALD.